(12) United States Patent
Saruwatari

(10) Patent No.: US 6,751,030 B2
(45) Date of Patent: Jun. 15, 2004

(54) ZOOM LENS AND IMAGE-TAKING APPARATUS

(75) Inventor: Hiroshi Saruwatari, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/452,029

(22) Filed: May 30, 2003

(65) Prior Publication Data

US 2003/0227691 A1 Dec. 11, 2003

(30) Foreign Application Priority Data

Jun. 4, 2002 (JP) .................................. 2002-163472
Jun. 4, 2002 (JP) .................................. 2002-163473

(51) Int. Cl.$^7$ .............................................. G02B 15/14
(52) U.S. Cl. ..................... 359/687; 359/683; 359/740; 359/774
(58) Field of Search .............................. 359/687, 686, 359/683, 676, 740, 774

(56) References Cited

U.S. PATENT DOCUMENTS

| | | | |
|---|---|---|---|
| 4,299,452 A | 11/1981 | Ikemori | 350/426 |
| 4,370,031 A | 1/1983 | Ikemori | 350/426 |
| 4,695,133 A * | 9/1987 | Kitagishi et al. | 359/685 |
| 5,283,639 A | 2/1994 | Esch et al. | 348/6 |
| 5,434,710 A | 7/1995 | Zozawa | 359/689 |
| 5,570,233 A | 10/1996 | Mihara et al. | 359/687 |
| 5,748,383 A * | 5/1998 | Ohtake | 359/683 |
| 5,933,281 A * | 8/1999 | Suzuki | 359/676 |
| 6,069,743 A * | 5/2000 | Nagata et al. | 359/687 |
| 6,104,548 A | 8/2000 | Nakayama et al. | 359/690 |
| 6,456,441 B2 * | 9/2002 | Hoshi | 359/687 |
| 6,483,648 B1 * | 11/2002 | Yamanashi | 359/683 |
| 6,631,034 B2 * | 10/2003 | Yamanashi | 359/684 |
| 6,633,437 B1 * | 10/2003 | Hoshi et al. | 359/687 |

FOREIGN PATENT DOCUMENTS

| | | |
|---|---|---|
| JP | 7747572 | 4/1977 |
| JP | 56019022 A | 2/1981 |
| JP | 92181103 A | 7/1992 |
| JP | 9552256 | 3/1995 |

* cited by examiner

Primary Examiner—Evelyn A. Lester
(74) Attorney, Agent, or Firm—Morgan & Finnegan, LLP

(57) ABSTRACT

A zoom lens comprising four lens units is disclosed which achieves a high variable magnification ratio and favorable optical performance at an arbitrary zoom position. The zoom lens of the present invention includes, in order from an object side, a first lens unit having positive optical power, a second lens unit having a negative optical power, a third lens unit having a positive optical power, and a fourth lens unit having a positive optical power. During zooming from the wide angle end to the telephoto end, the spacing between the first and second lens units is increased, the spacing between the second and third lens units is decreased, the spacing between the third and fourth lens units is increased, and an aperture stop moves together with the third lens unit. In addition, specific conditions are satisfied.

15 Claims, 13 Drawing Sheets

(W)

(M)

(T)

(W)

(M)

(T)

(W)

(M)

(T)

(W)

A B    C D (M)

(T)

(W)

(M)

(T)

(W)

(M)

(T)

ZOOM LENS AND IMAGE-TAKING APPARATUS

BACKGROUND OF THE INVENTION

1. Field of the Invention

The present invention relates to a zoom lens, and more particularly, to a zoom lens which is preferable for use in an image-taking apparatus such as a video camera and a digital camera which uses a solid-state image pickup element as an image pickup device.

2. Description of the Related Art

Conventionally, a zoom lens of a so-called negative lead type having a lens unit with a negative optical power at the front has been used as a standard zoom lens in many cameras since it relatively easily achieves image taking at a wider angle.

As an exemplary standard zoom lens of this type, Japanese Patent Application Laid-Open No. 1978-132360 (corresponding to U.S. Pat. No. No.4,299,452), Japanese Patent Application Laid-Open No. 1981-19022 (corresponding to U.S. Pat. No. 4,370,031), and U.S. Pat. No. 5,283,639 each have proposed or disclosed a so-called two unit zoom lens consisting of two lens units, that is, a first lens unit having a negative optical power and a second lens unit having a positive optical power, in which these two lens units are moved along an optical axis to change the spacing between the lens units to provide zooming.

Japanese Patent Application Laid-Open No. 1995-52256 has proposed a zoom lens having, in order from an object side, a first lens unit having a negative optical power, a second lens unit having a positive optical power, and a third lens unit having a positive optical power, in which the spacing between the second lens unit and the third lens unit is increased to provide zooming from the wide angle end to the telephoto end.

In addition, U.S. Pat. No. 5,434,710 has disclosed a zoom lens having, in order from an object side, three lens units consisting of a first lens unit having a negative optical power, a second lens unit having a positive optical power, and a third lens unit having a positive optical power, in which the spacing between the second lens unit and the third lens unit is reduced to provide zooming from the wide angle end to the telephoto end.

The present inventor has also proposed a multiunit zoom lens comprising of three or more lens units in Japanese Patent Application Laid-Open No. 1994-27377 (corresponding to U.S. Pat. No. 6,104,548).

Typically, the negative lead type zoom lens having a lens unit with a negative optical power at the front is characterized in that image taking is relatively easily performed at a wider angle and that a predetermined back focal distance can be readily provided.

To achieve favorable optical performance throughout the zoom range or throughout an image plane, it is necessary to appropriately set the arrangement of the optical powers of respective lens units and the shapes of lenses.

Inappropriately setting the arrangement of the optical powers of the respective lens units and the lens shapes increases variations in aberration associated with to cause difficulty in providing high optical performance throughout the zoom range.

Especially, in the two unit zoom lens having a lens unit with a negative optical power at the front, the relative positions of the respective lens units on an optical axis are uniquely determined resulting from varied magnification and corrected variations in the position of an image plane. As a result, optical performance cannot be controlled arbitrarily at a certain position while zooming from the wide angle end to the telephoto end.

Variations in aberration need to be minimized in the respective lens units during zooming in order to provide favorable optical performance at a certain point during zooming. As a method to address this, for example, the optical power is reduced in each lens unit, or a larger number of lens elements are used to form each lens unit. These methods, however, lead to an increase in the overall length of the lenses and difficulty in achieving high zooming ratio and high performance.

To solve the problems, U.S. Pat. No. 5,570,233 has disclosed a zoom lens consisting of, in order from an object side, a first lens unit having a positive optical power, a second lens unit having a negative optical power, a third lens unit having a positive optical power, and a fourth lens unit having a positive optical power, in which each lens unit is moved to provide zooming.

With the development of the image pickup device, however, further improvement in optical performance is required in the field of optical apparatuses such as a video camera and a digital camera in which increasingly higher performance is desired.

Additionally, in a zoom lens of a type in which a lens unit closer to an image plane than an aperture stop moves in association with zooming, the exit pupil distance largely varies as a higher zooming ratio is provided. In a CCD frequently used as an image pickup device in recent years, for example, if the incident angle of light rays on an imaging plane varies, the angle of the light rays passing through a color filter is changed to create the possibility of causing a problem of color bleeding on the periphery of an image.

SUMMARY OF THE INVENTION

It is an object of the present invention to provide a zoom lens comprising four lens units which achieves a high zoom ratio and provides favorable optical performance at an arbitrary zoom position.

It is another object of the present invention to provide a zoom lens which involves small variations in the exit pupil distance during zooming, in addition to the aforementioned object.

To achieve the aforementioned objects, the zoom lens according to an aspect of the present invention includes, in order from an object side to an image side, a first lent unit which has a positive optical power, a second lens unit which has a negative optical power, a third lens unit which has a positive optical power, and a fourth lens unit which has a positive optical power. During zooming from the wide angle end to the telephoto end, the spacing between the first lens unit and the second lens unit is increased, the spacing between the second lens unit and the third lens unit is reduced, the spacing between the third lens unit and the fourth lens unit is increased, and an aperture stop moves together with the third lens unit. In addition, specific conditions described in the following embodiments are satisfied.

According to another aspect of the present invention, the zoom lens includes, in order from an object side to an image side, a first lens unit which has a positive optical power, a second lens unit which has a negative optical power, a third lens unit which has a positive optical power, and a fourth lens unit which has a positive optical power. The spacing between the respective lens units changes during zooming, and specific conditions described in the following embodiments are satisfied.

Characteristics of the zoom lens of the present invention will be apparent from the following description of specific embodiments with reference to the drawings.

DETAILED DESCRIPTION OF THE PREFERRED EMBODIMENTS

Preferred embodiments of the present invention are hereinafter described with reference to the drawings.

An image-taking apparatus which embodies the present invention uses a zoom lens according to any of Embodiment 1 to Embodiment 6 shown in FIGS. 1, 3, 5, 7, 9, and 11 to form an object image on a solid-state image pickup element (photoelectric conversion element) such as a CCD and a CMOS sensor disposed on an image plane IP.

Figure 1:
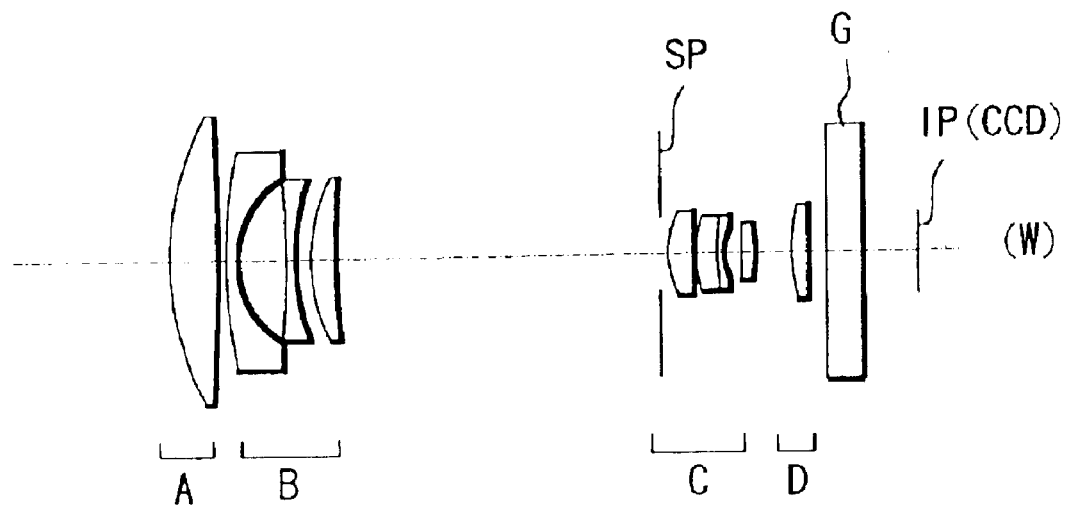
FIG. 1 is a section view of a zoom lens which is Embodiment 1 of the present invention.
Figure 1:
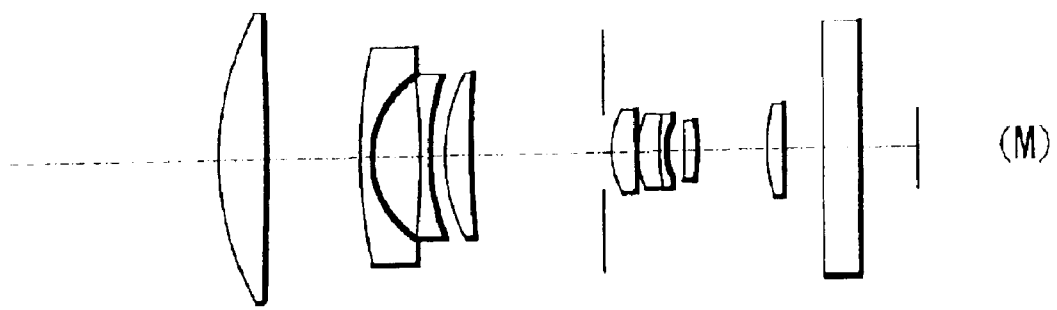
Figure 1:
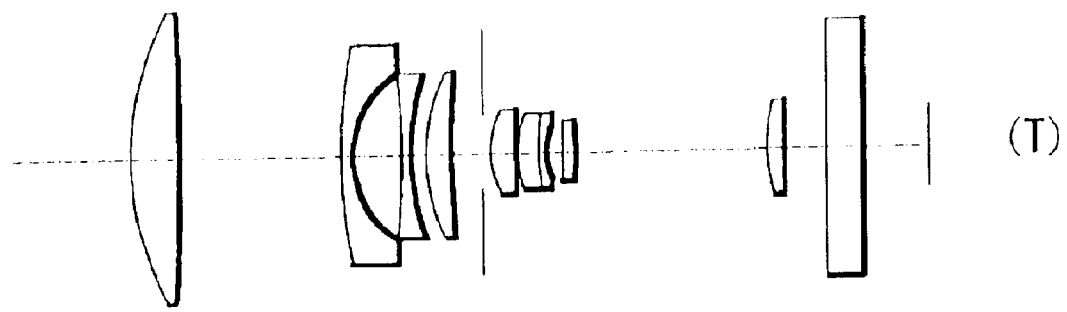
Figure 3:
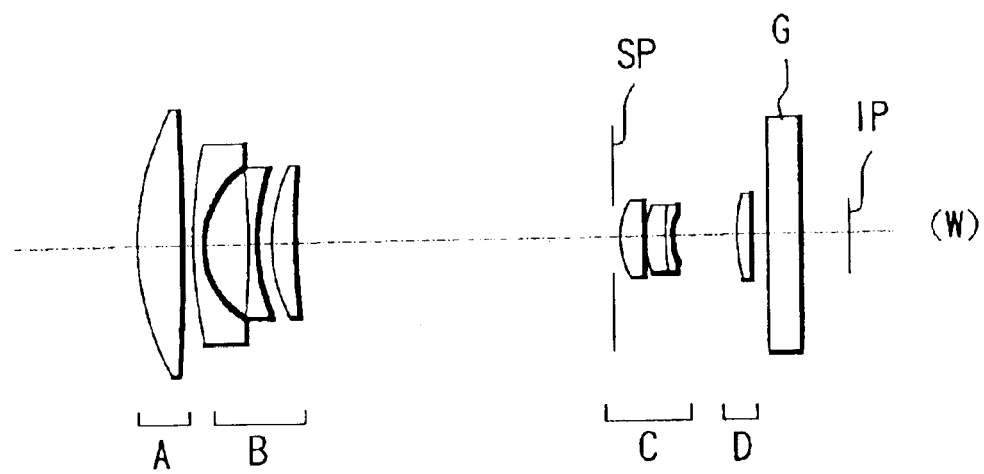
FIG. 3 is a section view of a zoom lens which is Embodiment 2 of the present invention.
Figure 3:
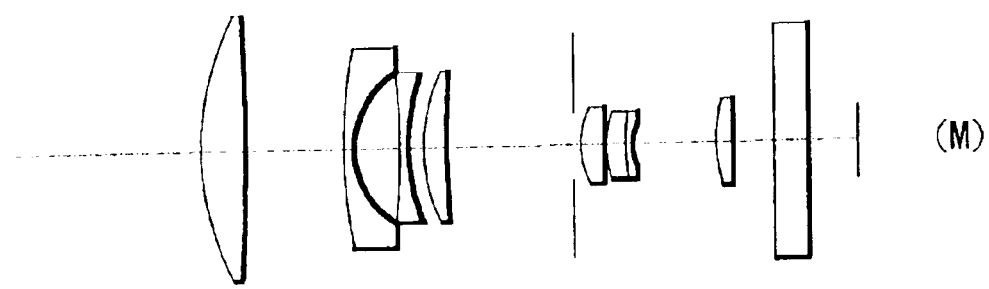
Figure 3:
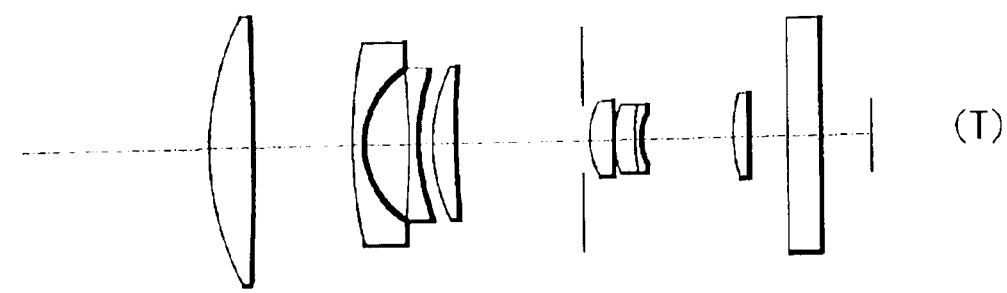
Figure 5:
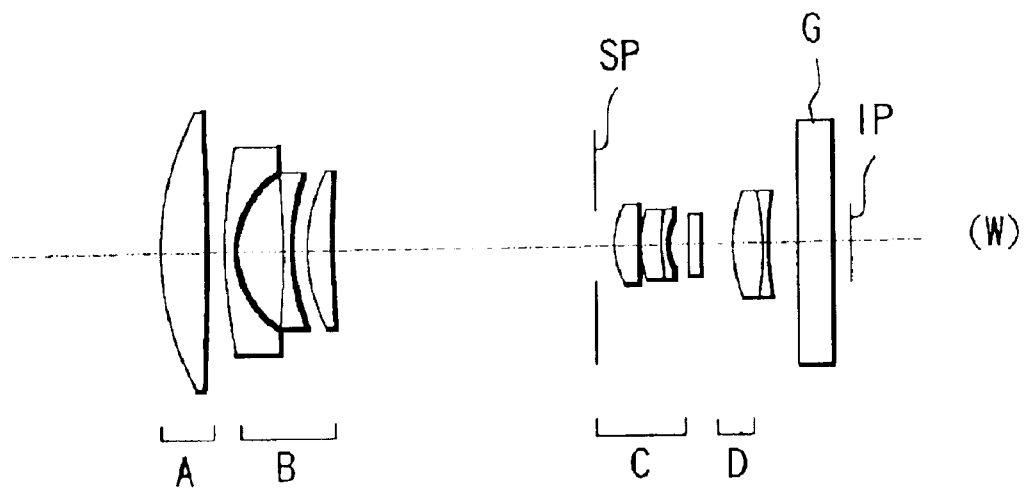
FIG. 5 is a section view of a zoom lens which is Embodiment 3 of the present invention.
Figure 5:
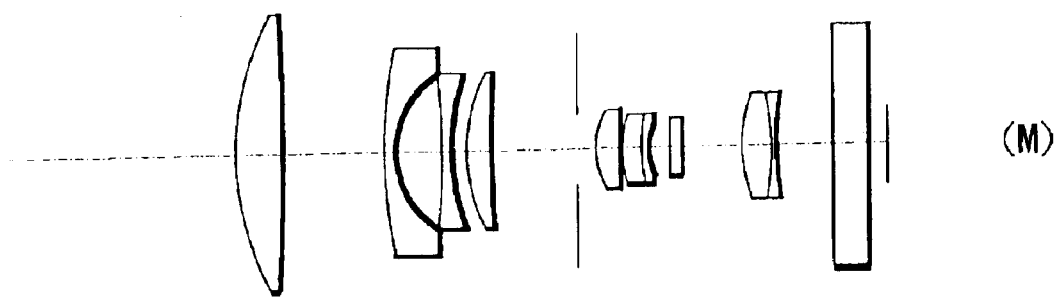
Figure 5:
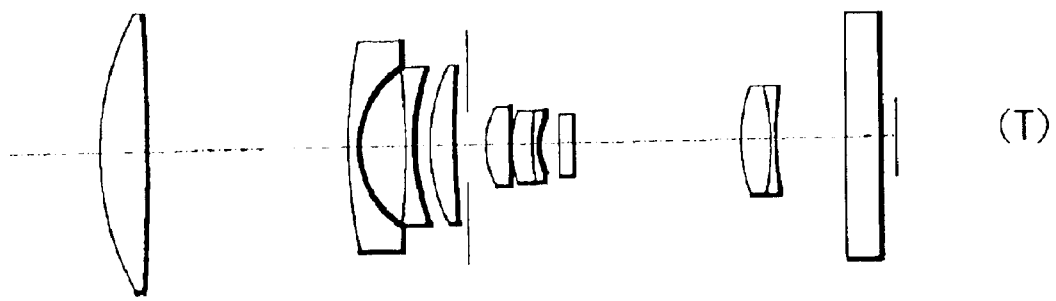

First of all, description is made for zoom lenses according to Embodiment 1 to Embodiment 3 shown in FIGS. 1, 3, and 5.

FIGS. 1, 3, and 5 are section views showing the zoom lenses of Embodiment 1 to Embodiment 3, in which (W) represents the wide angle end, (M) an middle zoom position, and (T) the telephoto end. In each section view, in order from an object side (the left side in each figure), letter A shows a first lens unit having a positive optical power (the optical power is the reciprocal of the focal length of the lens unit), letter B a second lens unit having a negative optical power, letter C shows a third lens unit having a positive optical power, and letter D shows a fourth lens unit having a positive optical power.

SP shows an aperture stop and G shows a glass block such as a optical filter or a face plate.

In the zoom lens in each of Embodiment 1 to Embodiment 3, the entire zoom lens system comprises at least four lens units, and zooming is provided by changing the spacing between the respective units on an optical axis.

In Embodiment 1 to Embodiment 3, for zooming from the wide angle end to the telephoto end, the spacing between the first lens unit A and the second lens unit B is increased, the spacing between the second lens unit B and the third lens unit C is reduced, and the spacing between the third lens unit C and the fourth lens unit D is increased. The aperture stop SP moves together with the third lens unit C.

Each zoom lens system in Embodiment 1 to 3 satisfies the following conditional expression:

$$-1.0 < (Cw-Ct)/f3 < -0.6 \quad (1)$$

where Cw represents the spacing between the third lens unit C and the fourth lens unit D on the optical axis at the wide angle end, Ct represents the spacing between the third lens unit C and the fourth lens unit D on the optical axis at the telephoto end, and f3 represents the focal length of the third lens unit C.

The conditional expression (1) relates to the track of movement and the optical power of the third lens unit C. If the ratio of (Cw−Ct)/f3 exceeds the upper limit in the conditional expression (1), the third lens unit C moves over an unacceptably long distance, and thus variations in the exit pupil cannot be suppressed. On the other hand, if the ratio is less than the lower limit, the third lens unit C has such a low optical power that it is difficult to reduce the overall length of the zoom lens.

In Embodiment 1 to Embodiment 3, for zooming from the wide angle end to the telephoto end, the third lens unit C moves toward the object side, and the fourth lens unit D moves along a track which is convex toward the object side. The following conditional expression is preferably satisfied:

$$0.2 < fw/f4 < 0.35 \quad (2)$$

where fw represents the focal length of the entire zoom lens system at the wide angle end, and f4 represents the focal length of the fourth lens unit D.

The conditional expression (2) relates to the optical power of the fourth lent unit D. If the ratio of fw/f4 exceeds the upper limit in the conditional expression (2), the refractive power of the fourth lens unit D is so high that it is impossible to eliminate the influence of variations in the aperture stop SP, which moves together with the third lens unit C, exerting upon variations in the exit pupil. On the other hand, if the ratio is less than the lower limit, the optical power of the fourth lens unit D is so low that it is difficult to suppress variations in aberration in zooming which is advantageously small in the structure of the four lens unit.

To maintain a small overall length of the zoom lens, it is preferable that the first lens unit A and the second lens unit B are moved along a track which is convex toward the image side when zooming from the wide angle end to the telephoto end. As a result, variations in aberration can be reduced throughout the entire zoom range.

In addition, the focal length of the fourth lens unit D preferably satisfies:

$$0.25 < fw/f4 < 0.35 \quad (3)$$

when the third lens unit C consists of a positive lens element, a cemented lens in which a positive lens element and a negative lens element are cemented, in order from the object side.

Furthermore, the following conditional expression is preferably satisfied:

$$0.2 < fw/f4 < 0.3 \quad (4)$$

when the third lens unit C consists of a positive lens element, a cemented lens in which a positive lens element and a negative lens element are cemented, and a positive lens element, in order from the object side.

More preferably, the following conditional expression is satisfied when the third lens unit C consists of a positive lens element, a cemented lens in which a positive lens element and a negative lens element are cemented, and a positive lens element, in order from the object side:

$$0.1 < f3/f3r < 0.4 \quad (5)$$

where f3r represents the focal length of the lens element closest to the image side of the third lens unit C.

The conditional expression (5) defines a proper range for maintaining a proper focal length of the lens closest to the image side of the third lens unit C to reduce variations in the emergent angle of light rays emerging from the third lens unit C.

Next, numerical examples of Embodiment 1 to Embodiment 3 are shown. A numerical example of Embodiment 1 shown in FIG. 1 is referred to as Numerical Example 1, a numerical example of Embodiment 2 in FIG. 3 as Numerical Example 2, and a numerical example of Embodiment 3 in FIG. 5 as Numerical Example 3.

In each numerical example, ri represents the radius of curvature of the i-th lens surface in order from the object side, di represents the thickness of the i-th optical member in order from the object side or the air space corresponding thereto, and ni and vi represent the refractive index and the Abbe number of the material of the i-th optical member in order from the object side.

When a lens surface is an aspheric shape, the aspheric shape is represented by the following expression:

$$X = \frac{(1/R)Y^2}{1 + \sqrt{1 - (1+K)(Y/R)^2}} + BY^4 + CY^6 + DY^8 + EY^{10}$$

where R represents the radius of curvature of the center of the lens surface, an X axis represents an optical axis direction (traveling direction of light), a Y axis represents a direction perpendicular to the optical axis, a K represents the conic constant, and B, C, and D, are aspheric coefficients. "e-X" means "x10$^{-x}$." Furthermore, in each numerical example, f represents a focal length, fno represents a F number, and ω represents half of the field angle.

Numerical Example 1

TABLE 1

| f = 7.46779 | fno = 1:2.7 | 2ω = 63.2 | |
|---|---|---|---|
| r1 = 35.389 | d1 = 5.50 | n1 = 1.51633 | v1 = 64.1 |
| r2 = −528.126 | d2 = VARIABLE | | |
| r3 = 71.708 | d3 = 1.30 | n2 = 1.80400 | v2 = 46.6 |
| r4 = 11.296 | d4 = 5.50 | | |
| r5 = −73.005 | d5 = 1.00 | n3 = 1.77250 | v3 = 49.6 |
| r6 = 27.283 | d6 = 1.70 | | |
| r7 = 21.795 | d7 = 2.80 | n4 = 1.84666 | v4 = 23.9 |
| r8 = 103.969 | d8 = VARIABLE | | |
| r9 = ∞ (APERA-TURE STOP) | d9 = 0.80 | | |
| r10 = 9.786 | d10 = 2.80 | n5 = 1.72916 | v5 = 54.7 |
| r11 = 54.605 | d11 = 0.30 | | |
| r12 = 12.273 | d12 = 2.40 | n6 = 1.69350 | v6 = 53.2 |
| r13 = 25.204 | d13 = 0.70 | n7 = 1.84666 | v7 = 23.9 |
| r14 = 7.182 | d14 = 2.20 | | |
| r15 = −81.570 | d15 = 1.40 | n8 = 1.51633 | v8 = 64.1 |
| r16 = −24.163 | d16 = VARIABLE | | |
| r17 = 28.000 | d17 = 2.00 | n9 = 1.80610 | v9 = 40.7 |

TABLE 1-continued

| f = 7.46779 | fno = 1:2.7 | 2ω = 63.2 | |
|---|---|---|---|
| r18 = −1242.352 | d18 = VARIABLE | | |
| r19 = ∞ | d19 = 4.00 | n10 = 1.51680 | v10 = 64.2 |
| r20 = ∞ | | | |

| FOCAL LENGTH/VARIABLE SPACING | 7.47 | 16.47 | 36.29 |
|---|---|---|---|
| d2 | 1.20 | 10.92 | 18.54 |
| d8 | 37.10 | 15.13 | 3.55 |
| d16 | 4.06 | 7.91 | 22.43 |
| d18 | 2.00 | 4.36 | 4.91 |

ASPHERIC SURFACE

12TH SURFACE

| R = 12.273 | K = 6.160E−1 | B = −1.849E−4 | C = −1.558E−6 |
| D = −2.399E−8 | | | |

17TH SURFACE

| R = 28.0 | K = 3.407E−1 | B = −1.954E−6 | C = 9.748E−8 |
| D = −3.041E−9 | | | |

Numerical Example 2

TABLE 2

| f = 7.45587 | fno = 1:2.8 | 2ω = 66.2 | |
|---|---|---|---|
| r1 = 33.880 | d1 = 6.00 | n1 = 1.51633 | v1 = 64.1 |
| r2 = −7025.879 | d2 = VARIABLE | | |
| r3 = 54.832 | d3 = 1.30 | n2 = 1.80400 | v2 = 46.6 |
| r4 = 11.212 | d4 = 5.93 | | |
| r5 = −72.278 | d5 = 1.00 | n3 = 1.77250 | v3 = 49.6 |
| r6 = 28.966 | d6 = 1.70 | | |
| r7 = 22.856 | d7 = 2.80 | n4 = 1.84666 | v4 = 23.9 |
| r8 = 103.245 | d8 = VARIABLE | | |
| r9 = ∞ (APERA-TURE STOP) | d9 = 0.80 | | |
| r10 = 9.193 | d10 = 2.80 | n5 = 1.69680 | v5 = 55.5 |
| r11 = 224.107 | d11 = 0.30 | | |
| r12 = 12.293 | d12 = 2.40 | n6 = 1.69350 | v6 = 53.2 |
| r13 = 26.680 | d13 = 0.70 | n7 = 1.84666 | v7 = 23.9 |
| r14 = 6.690 | d14 = VARIABLE | | |
| r15 = 20.006 | d15 = 2.00 | n8 = 1.80610 | v8 = 40.7 |
| r16 = 594.211 | d16 = VARIABLE | | |
| r17 = ∞ | d17 = 4.00 | n9 = 1.51633 | v9 = 64.2 |
| r18 = ∞ | | | |

| FOCAL LENGTH/VARIABLE SPACING | 7.46 | 16.45 | 36.32 |
|---|---|---|---|
| d2 | 1.00 | 10.93 | 20.76 |
| d8 | 37.42 | 14.90 | 3.57 |
| d14 | 6.73 | 10.17 | 22.87 |
| d16 | 2.00 | 4.56 | 5.72 |

ASPHERIC SURFACE

12TH SURFACE

| R = 12.29 | K = 4.853E−3 | B = −1.833E−4 | C = −2.283E−6 |
| D = −3.066E−8 | | | |

15TH SURFACE

| R = 20.01 | K = 2.087 | B = −4.443E−5 | C = −2.156E−8 |
| D = −5.081E−9 | | | |

Numerical Example 3

TABLE 3 f = 7.44598   fno = 1:2.8   2ω = 65.4

| | | | |
|---|---|---|---|
| r1 = 36.174 | d1 = 5.50 | n1 = 1.51633 | v1 = 64.2 |
| r2 = −2716.614 | d2 = VARIABLE | | |
| r3 = 50.435 | d3 = 1.30 | n2 = 1.77250 | v2 = 49.6 |
| r4 = 10.608 | d4 = 4.70 | | |
| r5 = 198.546 | d5 = 1.00 | n3 = 1.77250 | v3 = 49.6 |
| r6 = 16.816 | d6 = 1.70 | | |
| r7 = 15.988 | d7 = 2.80 | n4 = 1.84666 | v4 = 23.9 |
| r8 = 37.416 | d8 = VARIABLE | | |
| r9 = ∞ (APERATURE STOP) | d9 = 2.30 | | |
| r10 = 9.853 | d10 = 2.80 | n5 = 1.74330 | v5 = 49.3 |
| r11 = −422.142 | d11 = 0.30 | | |
| r12 = 11.114 | d12 = 2.40 | n6 = 1.69680 | v6 = 55.5 |
| r13 = 38.099 | d13 = 0.70 | n7 = 1.84666 | v7 = 23.9 |
| r14 = 6.158 | d14 = 2.00 | | |
| r15 = 254.815 | d15 = 1.40 | n8 = 1.60311 | v8 = 60.7 |
| r16 = −146.162 | d16 = VARIABLE | | |
| r17 = 16.773 | d17 = 3.40 | n9 = 1.73077 | v9 = 40.5 |
| r18 = −25.584 | d18 = 0.70 | n10 = 1.69680 | v10 = 55.5 |
| r19 = 96.538 | d19 = VARIABLE | | |
| r20 = ∞ | d20 = 4.00 | n11 = 1.51680 | v11 = 64.2 |
| r21 = ∞ | | | |

| FOCAL LENGTH/VARIABLE SPACING | 7.45 | 16.61 | 37.00 |
|---|---|---|---|
| d2 | 2.00 | 11.42 | 23.20 |
| d8 | 30.00 | 10.07 | 1.80 |
| d16 | 3.62 | 6.80 | 19.61 |
| d19 | 3.04 | 6.02 | 6.39 |

ASPHERIC SURFACE

10TH SURFACE

R = 9.853   K = −2.505   B = 2.312E−4   C = −1.947E−6
D = 4.993E−8   E = −1.152E−9

17TH SURFACE

R = 16.774   K = 8.657E−1   B = −3.579E−5   C = 1.114E−7
D = −1.522E−9   E = 2.917E−10

Table 4 shows the values calculated with the aforementioned conditional expressions (1) to (5) in Numerical Examples 1 to 3.

TABLE 4

| | Numerical Example 1 | Numerical Example 2 | Numerical Example 3 |
|---|---|---|---|
| Conditional expression (1) | −0.84 | −0.72 | −0.82 |
| conditional expressions (2) to (4) | 0.22 | 0.29 | 0.29 |
| conditional expression (5) | 0.33 | — | 0.13 |

Figure 2:
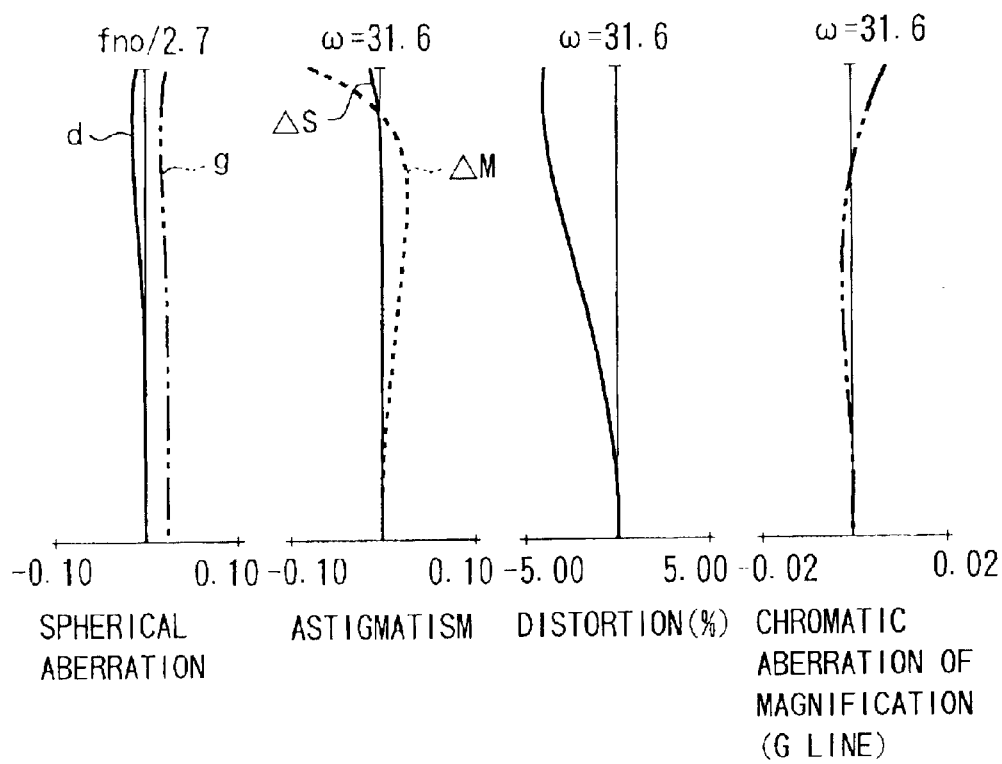
FIG. 2 shows aberrations in Numerical Example 1 of the present invention.
Figure 2:
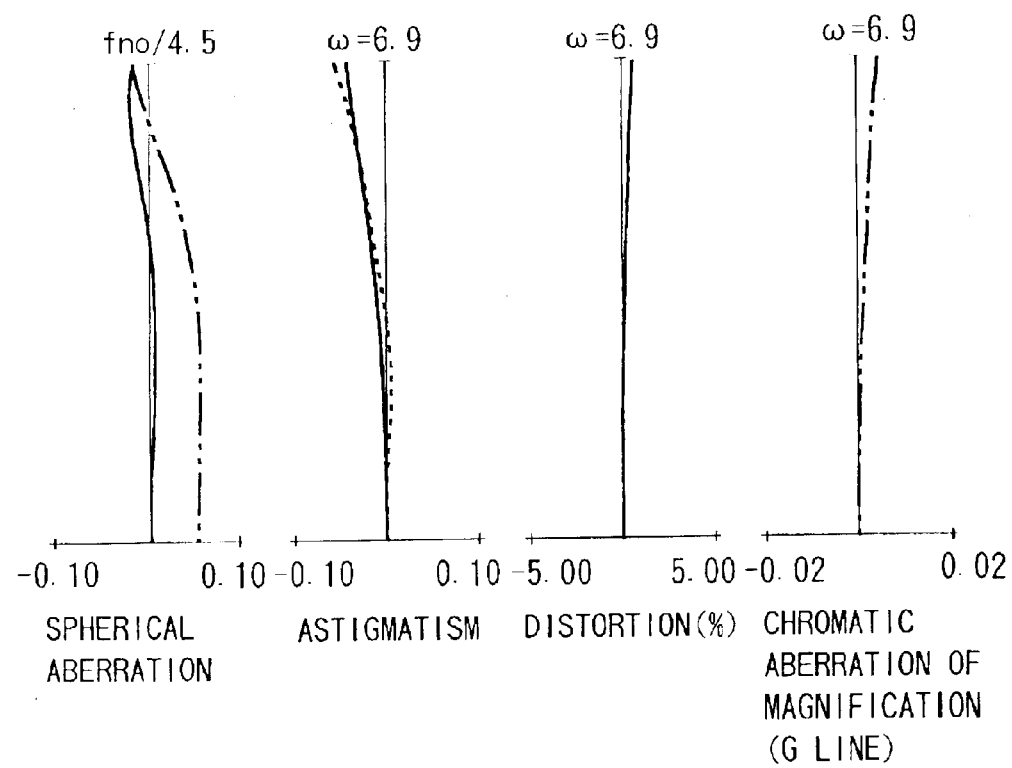
Figure 4:
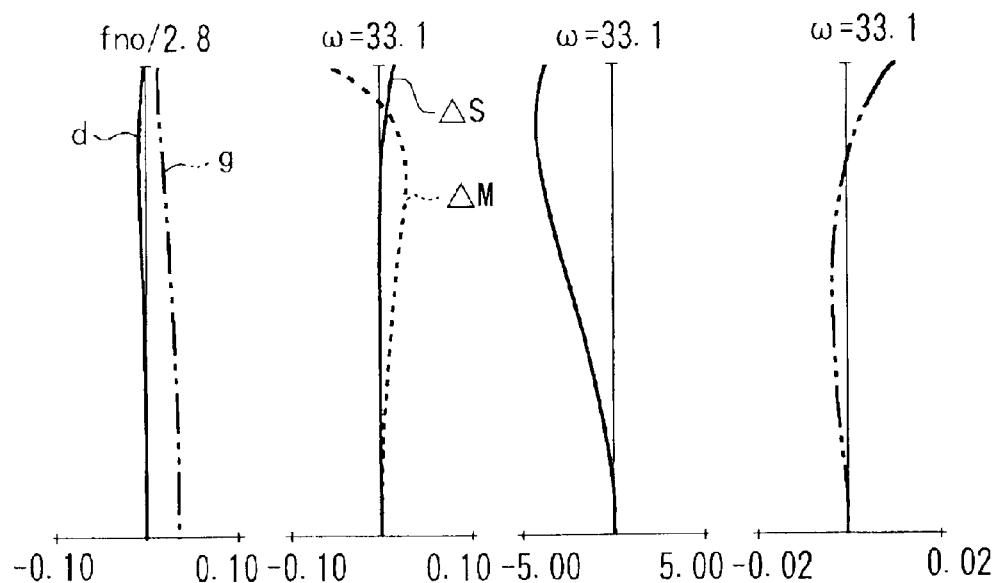
FIG. 4 shows aberrations in Numerical Example 2 of the present invention.
Figure 4:
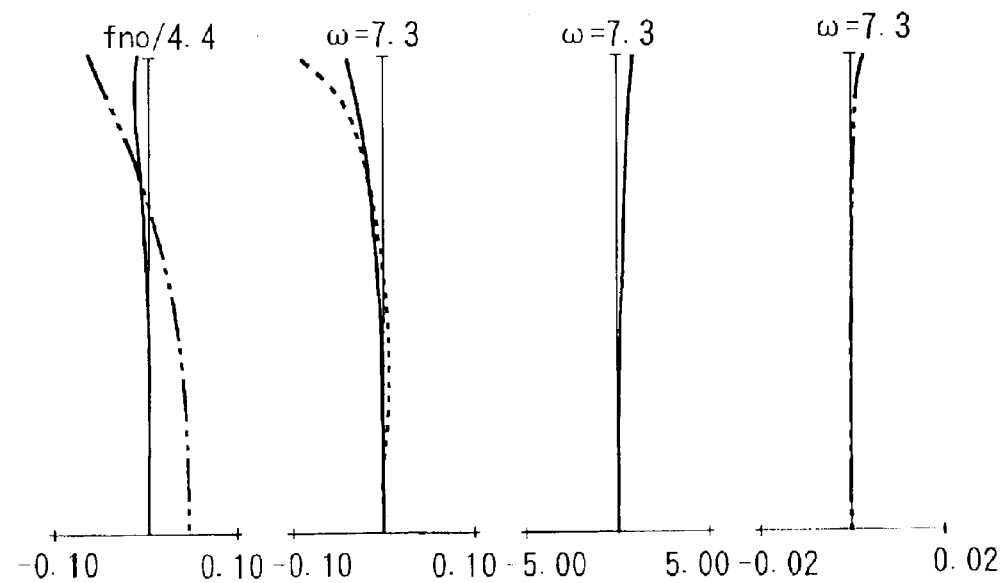
Figure 6:
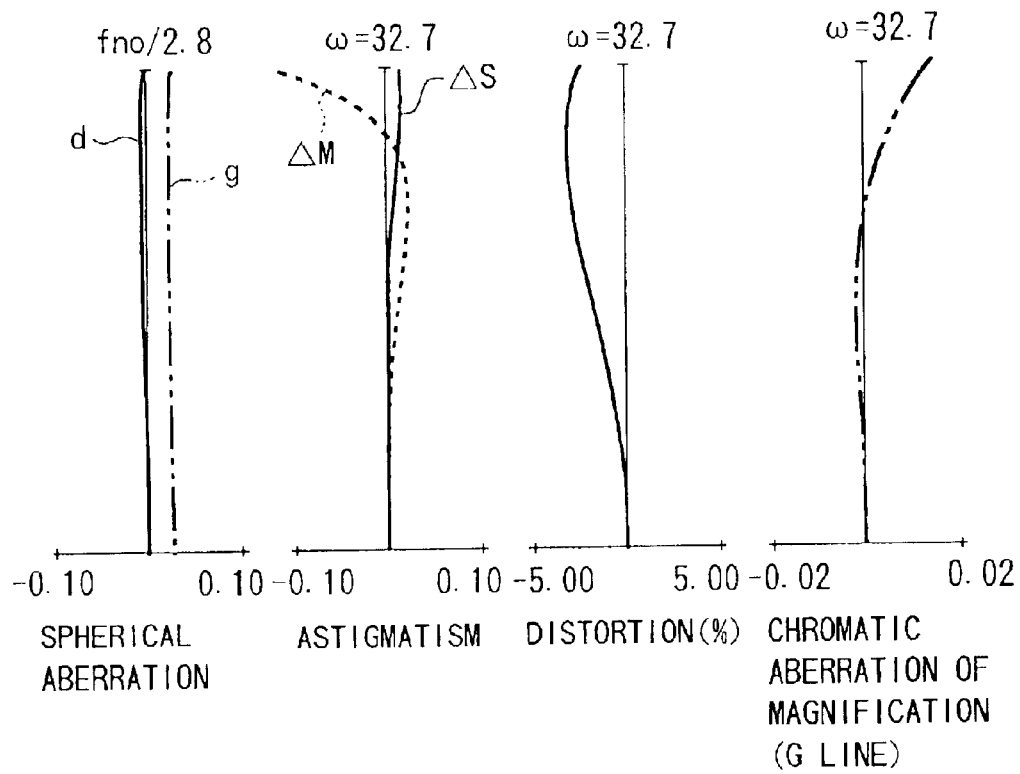
FIG. 6 shows aberrations in Numerical Example 3 of the present invention.
Figure 6:
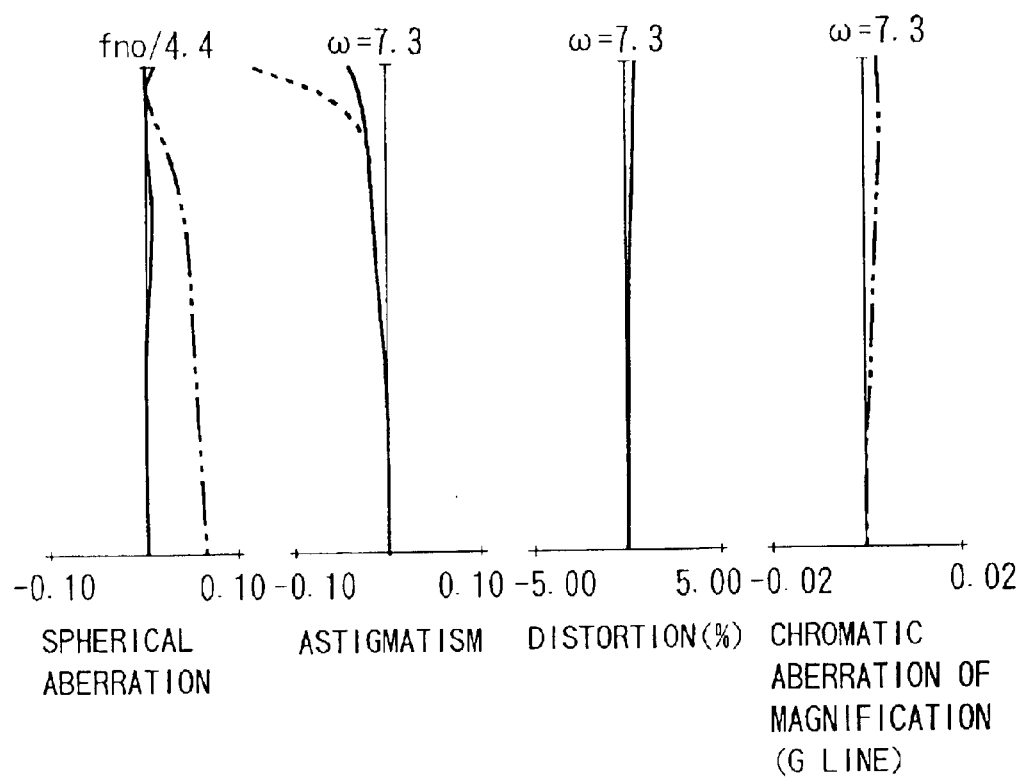

FIGS. 2, 4 and 6 show aberrations in Numerical Examples 1 to 3, respectively. In each of the figures, a curve d represents the aberration of a d line, a curve g represents the aberration of a g line, a curve ΔS represents the aberration on a sagittal image plane, and a curve ΔM represents the aberration on a meridional image plane, respectively.

As described above, according to Embodiment 1 to Embodiment 3, appropriately setting the arrangement of the optical powers in the respective lens units and the track of movement during zooming in the zoom lens of the four lens unit structure can provide favorable optical performance at an arbitrary zoom position and can reduce variations in the exit pupil distance throughout the entire zoom range.

Next. Embodiment 4 to Embodiment 6 are described.

Figure 7:
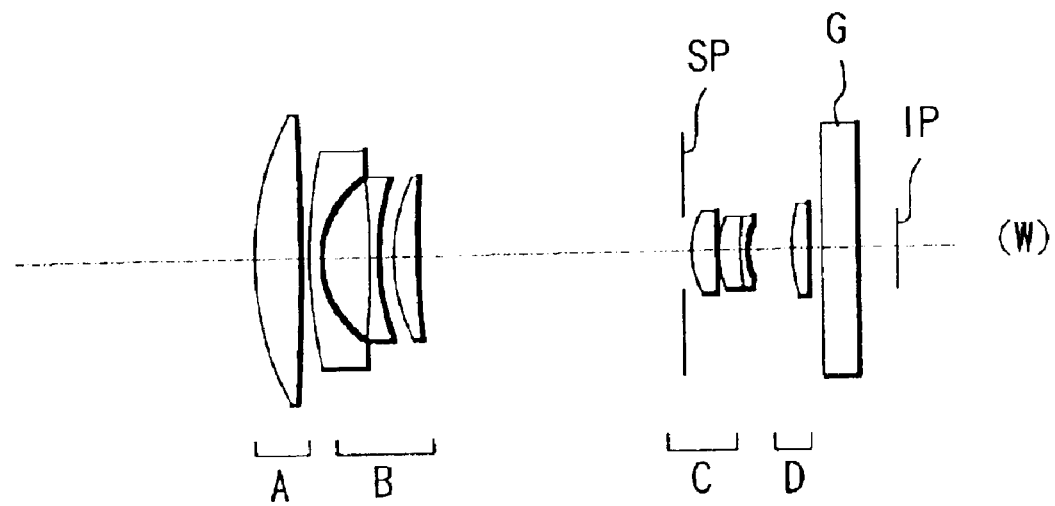
FIG. 7 is a section view of a zoom lens which is Embodiment 4 of the present invention.
Figure 7:
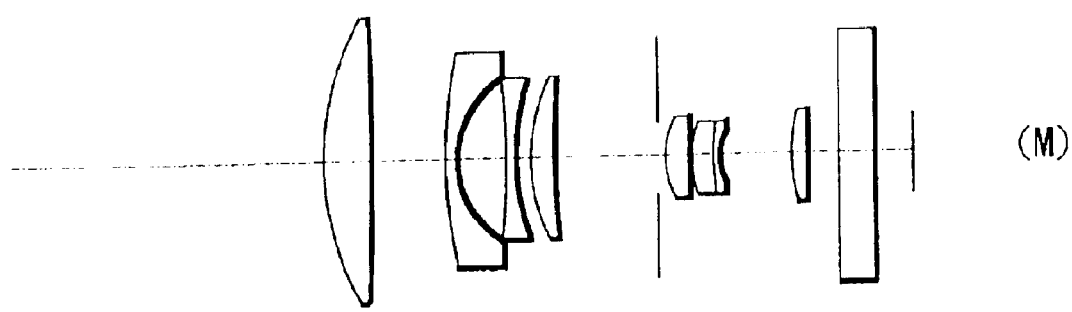
Figure 7:
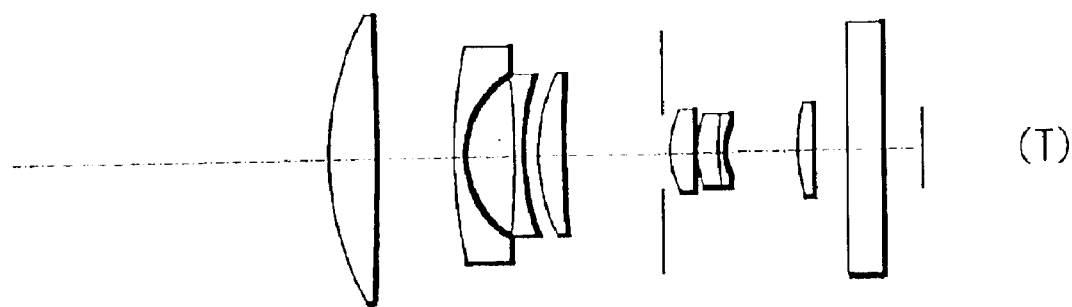
Figure 9:
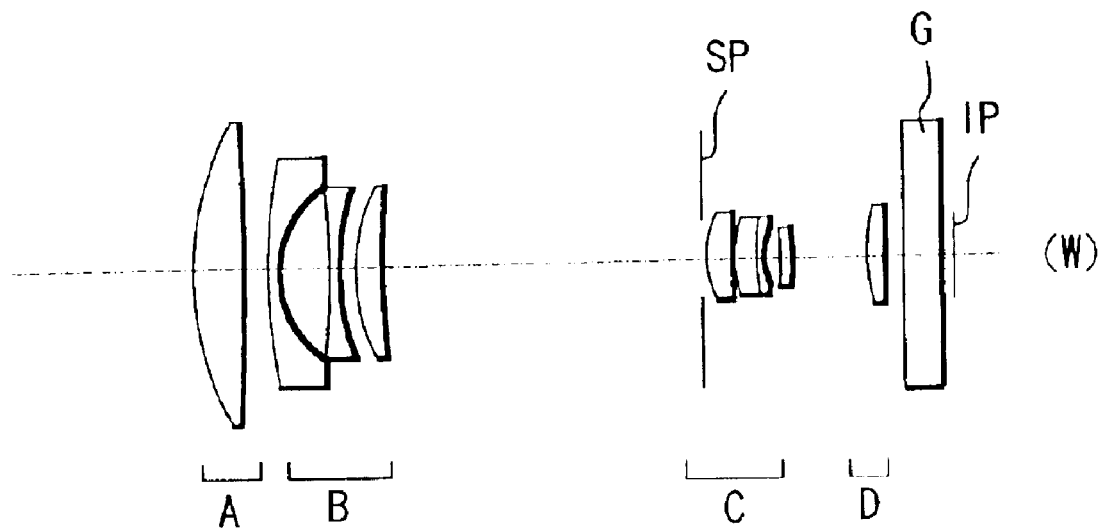
FIG. 9 is a section view of a zoom lens which is Embodiment 5 of the present invention.
Figure 9:
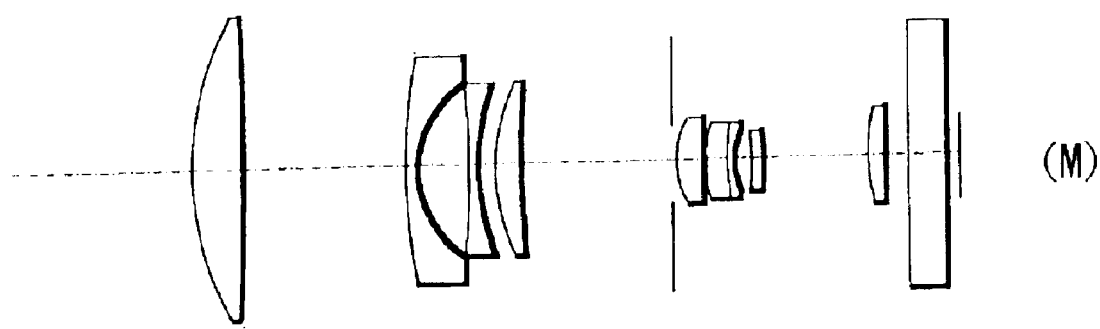
Figure 9:
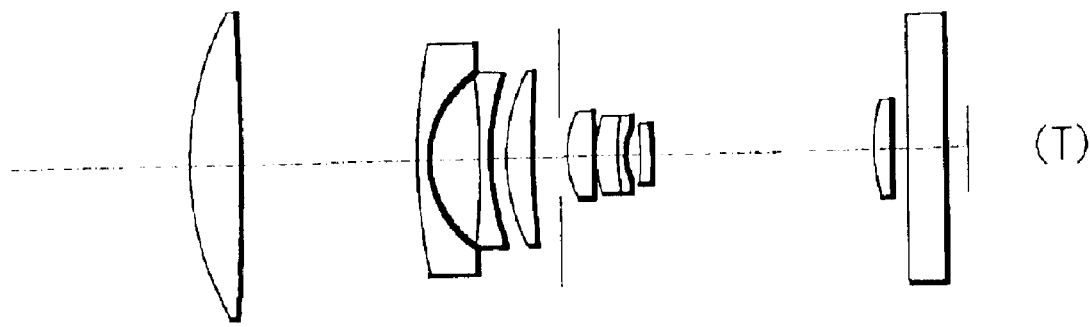
Figure 11:
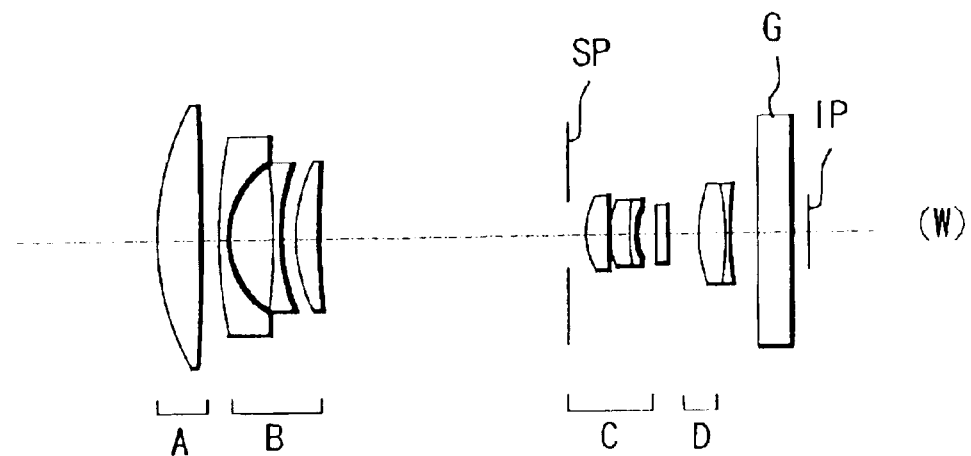
FIG. 11 is a section view of a zoom lens which is Embodiment 6 of the present invention.
Figure 11:
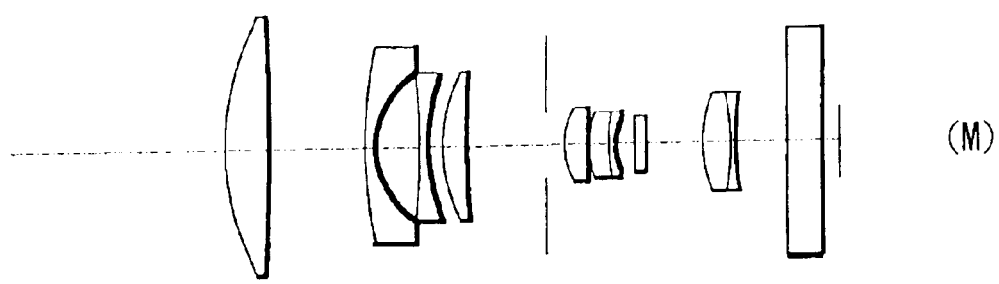
Figure 11:
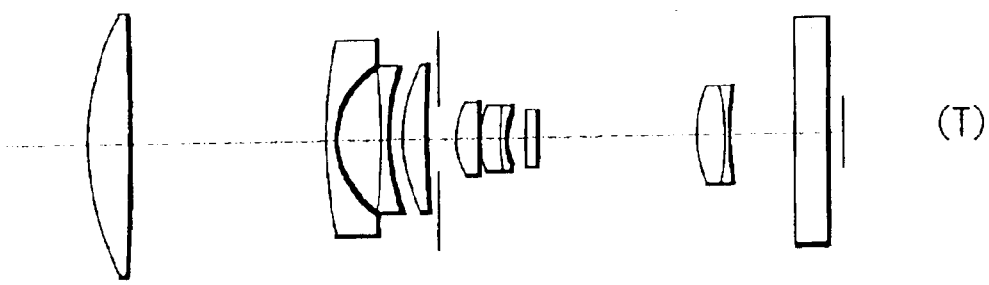

FIGS. 7, 9, and 11 are section views showing lenses of zoom lenses of Embodiment 4 to Embodiment 6, in which (W) represents the wide angle end, (M) an middle zoom position, and (T) the telephoto end. In each section view, in order from an object side (the left side in each figure), letter A shows a first lens unit having a positive optical power, letter B shows a second lens unit having a negative optical power, letter C shows a third lens unit having a positive optical power, and letter D shows a fourth lens unit having a positive optical power.

SP shows an aperture stop and G shows a glass block such as an optical filter or a face plate.

In the zoom lens in each of Embodiment 4 to Embodiment 6, the entire zoom lens system comprises four lens units, and zooming is provided by changing the spacing between the respective units on an optical axis.

Especially, the moving direction of the second lens unit B is reversed to follow a convex track toward the image side while zooming from the wide angle end to the telephoto end. Thus, the spacing margin between the second lens unit B and the third lens unit C can be reduced to achieve a reduction in size of the entire zoom lens system.

In each of Embodiment 4 to Embodiment 6, the following is satisfied:

$$0.9 < bwm/bwt < 2.0 \quad (6)$$

where bwm represents an amount of movement of the second lens unit B from the wide angle end to the position where the focal length fm of the entire zoom lens system is equal to the geometric mean $$(fm = \sqrt{(fw \cdot ft)})$$

of the focal length fw at the wide angle end and the focal length ft at the telephoto end, and bwt represents an amount of movement of the second lens unit B from the wide angle end to the telephoto end.

The conditional expression (6) relates to the moving amount of the second lens unit B in zooming. If the ratio of bwm/bwt exceeds the upper limit in the conditional expression (6), the second lens unit B moves over a large distance in the portion of the zoom region from the wide angle end to the middle point, making it difficult to achieve high zoom ratio of the entire zoom lens system. On the other hand, if the ratio of bwm/bwt is less than the lower limit, favorable correction of aberration is difficult to achieve in the middle zoom range.

In each of Embodiment 4 to Embodiment 6, appropriate arrangement of optical powers enables improved optical performance in the middle of zooming. In addition, when the first lens unit A consists of a single positive lens element, it is possible to provide both a reduced size of the entire zoom lens system and favorable correction of aberration.

In each of Embodiment 4 to Embodiment 6, the following conditional expression needs to be satisfied to form the first lens unit A of the single positive lens element:

$$0.05 < fw/f1 < 0.15 \quad (7)$$

where fw represents the focal length of the entire zoom lens system at the wide angle end, and f1 represents the focal length of the first lens unit A.

The conditional expression (7) relates to the focal length of the first lens unit A. If the ratio of fw/f1 exceeds the upper limit in the conditional expression (7), the first lens unit A has such a high power that the diameter of the first lens unit A is large. On the other hand, if the ratio is less than the lower limit, the first lens unit A disadvantageously has a low power to increase the overall length of the zoom lens required for a desired zoom ratio.

In addition, the first lens unit A is formed as a movable unit, and the overall length of the zoom lens at the telephoto end is set to be larger than the overall length of the zoom lens at the wide angle end. It is thus possible to reduce the burden of variable magnification on the other lens units.

The moving direction of the first lens unit A is reversed to follow a convex track toward the image side while zooming from the wide angle end to the telephoto end. This enables reduced variations in optical performance while zooming and a smaller diameter of the first lens unit A.

The third lens unit C is moved monotonously toward the object side (in such a manner that the moving direction is not changed) when zooming from the wide angle end to the telephoto end, and the fourth lens unit D is moved along a convex track toward the object side. Thus, optical performance can be enhanced throughout the entire zoom range in addition to a reduction in the burden of variable magnification on the second lens unit B.

To further enhance the performance, in each of Embodiment 4 to Embodiment 6, the following is preferably satisfied:

$$0.1 < (C_w - C_m)/(C_w - C_t) < 0.3 \quad (8)$$

$$-0.9 < f_2/f_3 (\text{or } f_3/f_w) < -0.6 \quad (9)$$

where Cw represents the spacing between the third lens unit C and the fourth lens unit D on the optical axis at the wide angle end, Ct the spacing between the third lens unit C and the fourth lens unit D on the optical axis at the telephoto end, Cm the spacing between the third lens unit C and the fourth lens unit D on the optical axis at the focal length fm of the entire zoom lens system, and fi the focal length of the i-th lens unit.

Both of the conditional expressions (8) and (9) relate to the arrangement of the optical power of the third lens unit C, and are important to appropriate burden sharing of variable magnification between the second lens unit B and the third lens unit C to achieve higher performance.

The aperture stop SP is moved together with the third lens unit C to facilitate simplification of the structure of a lens barrel (not shown) for accommodating this zoom lens.

Next, numerical examples of Embodiment 4 to Embodiment 6 are shown. A numerical example of Embodiment 4 shown in FIG. 7 is referred to as Numerical Example 4, a numerical example of Embodiment 5 in FIG. 9 as Numerical Example 5, and a numerical example of Embodiment 6 in FIG. 11 as Numerical Example 6.

In Numerical Examples 4 to 6, the definitions of reference symbols and the expression for representing an aspheric lens surface are identical to those in Numerical Examples 1 to 3 described above.

TABLE 5

| f = 7.45587 | fno = 1:2.8 | 2ω = 66.2 | |
|---|---|---|---|
| r1 = 33.880 | d1 = 6.00 | n1 = 1.51633 | ν1 = 64.1 |
| r2 = −7025.879 | d2 = VARIABLE | | |
| r3 = 54.832 | d3 = 1.30 | n2 = 1.80400 | ν2 = 46.6 |
| r4 = 11.212 | d4 = 5.93 | | |
| r5 = −72.278 | d5 = 1.00 | n3 = 1.77250 | ν3 = 49.6 |

TABLE 5-continued

| f = 7.45587 | fno = 1:2.8 | 2ω = 66.2 | |
|---|---|---|---|
| r6 = 28.966 | d6 = 1.70 | | |
| r7 = 22.856 | d7 = 2.80 | n4 = 1.84666 | ν4 = 23.9 |
| r8 = 103.245 | d8 = VARIABLE | | |
| r9 = ∞ (APERATURE STOP) | d9 = 0.80 | | |
| r10 = 9.193 | d10 = 2.80 | n5 = 1.69680 | ν5 = 55.5 |
| r11 = 224.107 | d11 = 0.30 | | |
| r12 = 12.293 | d12 = 2.40 | n6 = 1.69350 | ν6 = 53.2 |
| r13 = 26.680 | d13 = 0.70 | n7 = 1.84666 | ν7 = 23.9 |
| r14 = 6.690 | d14 = VARIABLE | | |
| r15 = 20.006 | d15 = 2.00 | n8 = 1.80610 | ν8 = 40.7 |
| r16 = 594.211 | d16 = VARIABLE | | |
| r17 = ∞ | d17 = 4.00 | n9 = 1.51633 | ν9 = 64.2 |
| r18 = ∞ | | | |

| FOCAL LENGTH/VARIABLE SPACING | 7.46 | 16.45 | 36.32 |
|---|---|---|---|
| d2 | 1.00 | 10.93 | 20.76 |
| d8 | 37.42 | 14.90 | 3.57 |
| d14 | 6.73 | 10.17 | 22.87 |
| d16 | 2.00 | 4.56 | 5.72 |

ASPHERIC SURFACE

12TH SURFACE

| R = 12.29 | K = 4.853E−3 | B = −1.833E−4 | C = −2.283E−6 |
|---|---|---|---|
| D = −3.066E−8 | | | |

17TH SURFACE

| R = 20.01 | K = 2.087 | B = −4.443E−5 | C = −2.156E−8 |
|---|---|---|---|
| D = 5.081E−9 | | | |

Numerical Example 5

TABLE 6

| f = 7.45587 | fno = 1:2.6 | 2ω = 66.4 | |
|---|---|---|---|
| r1 = 40.266 | d1 = 6.00 | n1 = 1.48749 | ν1 = 70.2 |
| r2 = −734.702 | d2 = VARIABLE | | |
| r3 = 76.424 | d3 = 1.30 | n2 = 1.80400 | ν2 = 46.6 |
| r4 = 11.861 | d4 = 5.35 | | |
| r5 = −67.123 | d5 = 1.00 | n3 = 1.77250 | ν3 = 49.6 |
| r6 = 31.704 | d6 = 1.70 | | |
| r7 = 23.332 | d7 = 2.80 | n4 = 1.84666 | ν4 = 23.9 |
| r8 = 100.885 | d8 = VARIABLE | | |
| r9 = ∞ (APERATURE STOP) | d9 = 0.80 | | |
| r10 = 9.818 | d10 = 2.80 | n5 = 1.69680 | ν5 = 55.5 |
| r11 = 87.682 | d11 = 0.30 | | |
| r12 = 12.726 | d12 = 2.40 | n6 = 1.69350 | ν6 = 53.2 |
| r13 = 20.514 | d13 = 0.70 | n7 = 1.84666 | ν7 = 23.9 |
| r14 = 7.404 | d14 = 1.80 | | |
| r15 = −66.106 | d15 = 1.40 | n8 = 1.51633 | ν8 = 64.1 |
| r16 = −18.575 | d16 = VARIABLE | | |
| r17 = 19.325 | d17 = 2.00 | n9 = 1.80610 | ν9 = 40.7 |
| r18 = 45.742 | d18 = VARIABLE | | |
| r19 = ∞ | d19 = 4.00 | n10 = 1.51880 | ν10 = 64.2 |
| r20 = ∞ | | | |

| FOCAL LENGTH/VARIABLE SPACING | 7.46 | 16.45 | 36.32 |
|---|---|---|---|
| d2 | 3.00 | 18.82 | 20.14 |
| d8 | 39.19 | 19.06 | 3.58 |
| d16 | 9.80 | 13.15 | 28.28 |
| d18 | 2.00 | 2.96 | 2.00 |

ASPHERIC SURFACE

12TH SURFACE

| R = 12.726 | K = 5.664E−1 | B = −1.891E−4 | C = −1.7595−6 |
|---|---|---|---|
| D = −1.421E−8 | | | |

TABLE 6-continued f = 7.45587   fno = 1:2.6   2ω = 66.4

17TH SURFACE

R = 19.325     K = −5.355    B = 7.372E−5   C = 1.514E−6
D = −2.911E−8

Numerical Example 6

TABLE 7 f = 7.44598   fno = 1:22.8   2ω = 65.4

| | | | |
|---|---|---|---|
| r1 = 36.74 | d1 = 5.50 | n1 = 1.51633 | ν1 = 64.2 |
| r2 = −2716.614 | d2 = VARIABLE | | |
| r3 = 50.435 | d3 = 1.30 | n2 = 1.77250 | ν2 = 49.6 |
| r4 = 10.608 | d4 = 4.70 | | |
| r5 = 198.546 | d5 = 1.00 | n3 = 1.77250 | ν3 = 49.6 |
| r6 = 16.816 | d6 = 1.70 | | |
| r7 = 15.988 | d7 = 2.80 | n4 = 1.84666 | ν4 = 23.9 |
| r8 = 37.416 | d8 = VARIABLE | | |
| r9 = ∞ (APERA-TURE STOP) | d9 = 2.30 | | |
| r10 = 9.853 | d10 = 2.80 | n5 = 1.74330 | ν5 = 49.3 |
| r11 = −422.142 | d11 = 0.30 | | |
| r12 = 11.114 | d12 = 2.40 | n6 = 1.69680 | ν6 = 55.5 |
| r13 = 38.099 | d13 = 0.70 | n7 = 1.84666 | ν7 = 23.9 |
| r14 = 6.158 | d14 = 2.00 | | |
| r15 = 254.815 | d15 = 1.40 | n8 = 1.60311 | ν8 = 60.7 |
| r16 = −146.162 | d16 = VARIABLE | | |
| r17 = 16.773 | d17 = 3.40 | n9 = 1.73077 | ν9 = 40.5 |
| r18 = −25.584 | d18 = 0.70 | n10 = 1.69680 | ν10 = 55.5 |
| r19 = 96.538 | d19 = VARIABLE | | |
| r20 = ∞ | d20 = 4.00 | n11 = 1.51680 | ν11 = 64.2 |
| r21 = ∞ | | | |

| FOCAL LENGTH/VARIABLE SPACING | 7.45 | 16.61 | 37.00 |
|---|---|---|---|
| d2 | 2.00 | 11.42 | 23.20 |
| d8 | 30.00 | 10.07 | 1.80 |
| d16 | 3.62 | 6.80 | 19.61 |
| d19 | 3.04 | 6.07 | 6.39 |

ASPHERIC SURFACE

10TH SURFACE

R = 9.853      K = −2.505    B = 2.312E−4   C = −1.947E−6
D = 4.993E−8   E = −1.152E−9

17TH SURFACE

R = 16.774     K = 8.657E·1  B = −3.579E−5  C = 1.114E−7
D = −1.522E−9  E = 2.917E−10

Table 8 shows the values calculated with the aforementioned conditional expressions (6) to (9) in Numerical Examples 4 to 6.

TABLE 8

| | Numerical Example 4 | Numerical Example 5 | Numerical Example 6 |
|---|---|---|---|
| conditional expression (6) | 1.18 | 0.92 | 1.55 |
| conditional expressions (7) | 0.11 | 0.10 | 0.11 |
| conditional expression (8) | 0.21 | 0.18 | 0.20 |
| conditional expression (9) | −0.71 | −0.82 | −0.76 |

Figure 8:
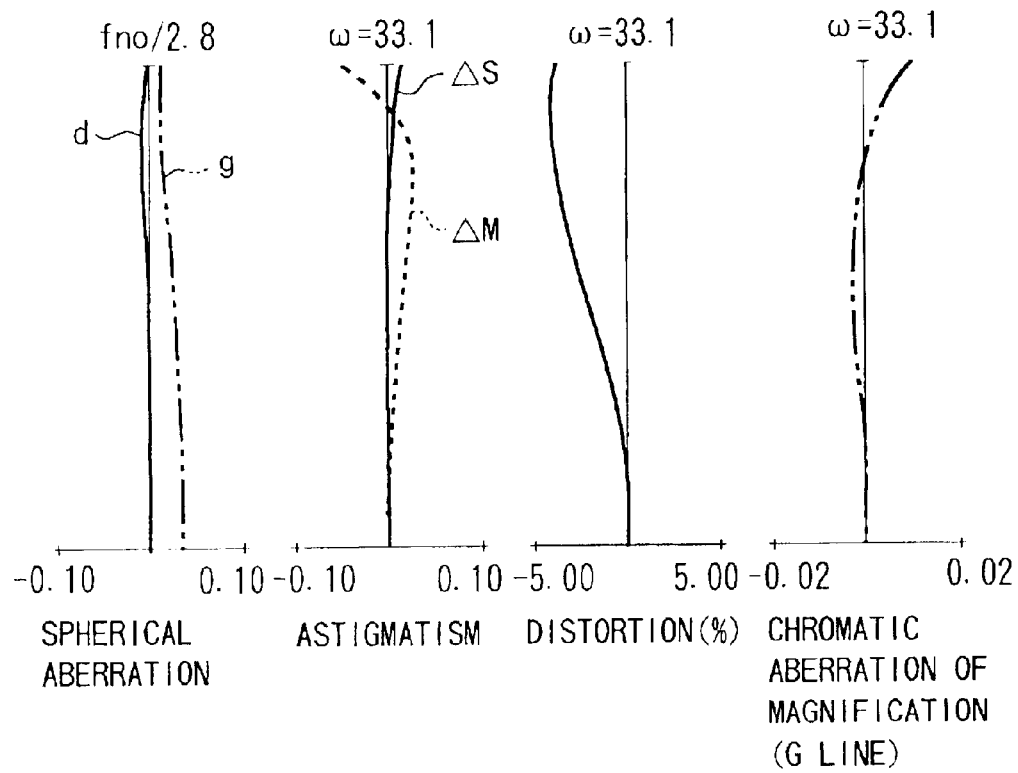
FIG. 8 shows aberrations in Numerical Example 4 of the present invention.
Figure 8:
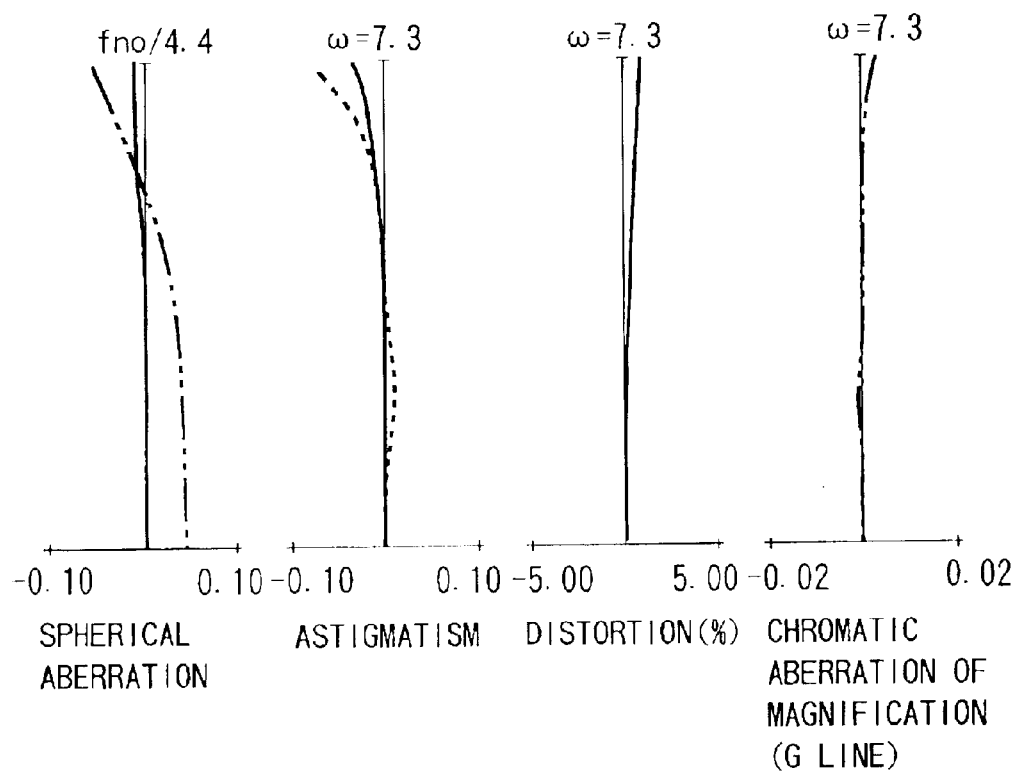
Figure 10:
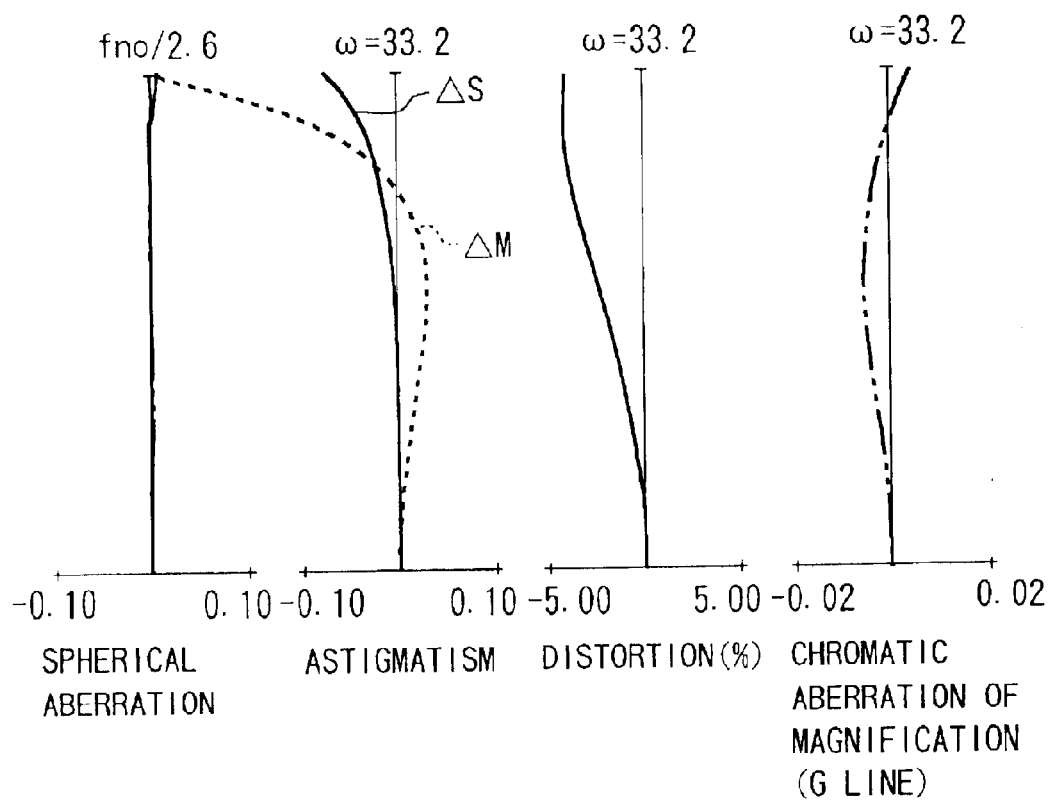
FIG. 10 shows aberrations in Numerical Example 5 of the present invention.
Figure 10:
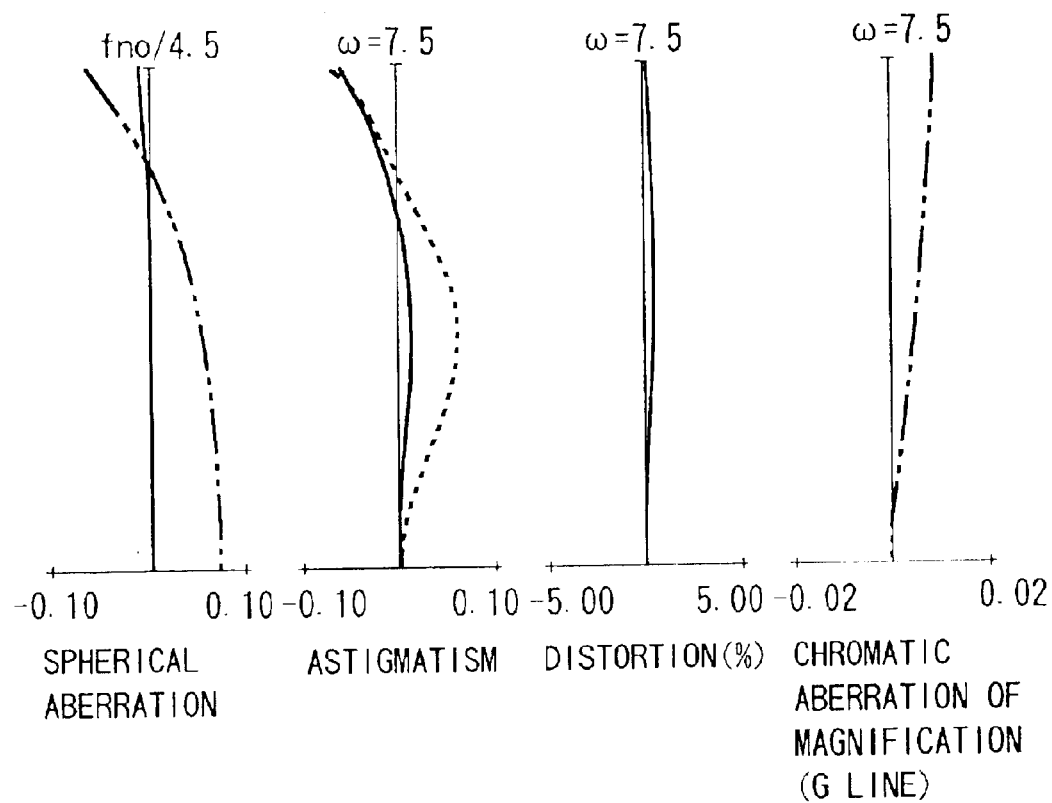
Figure 12:
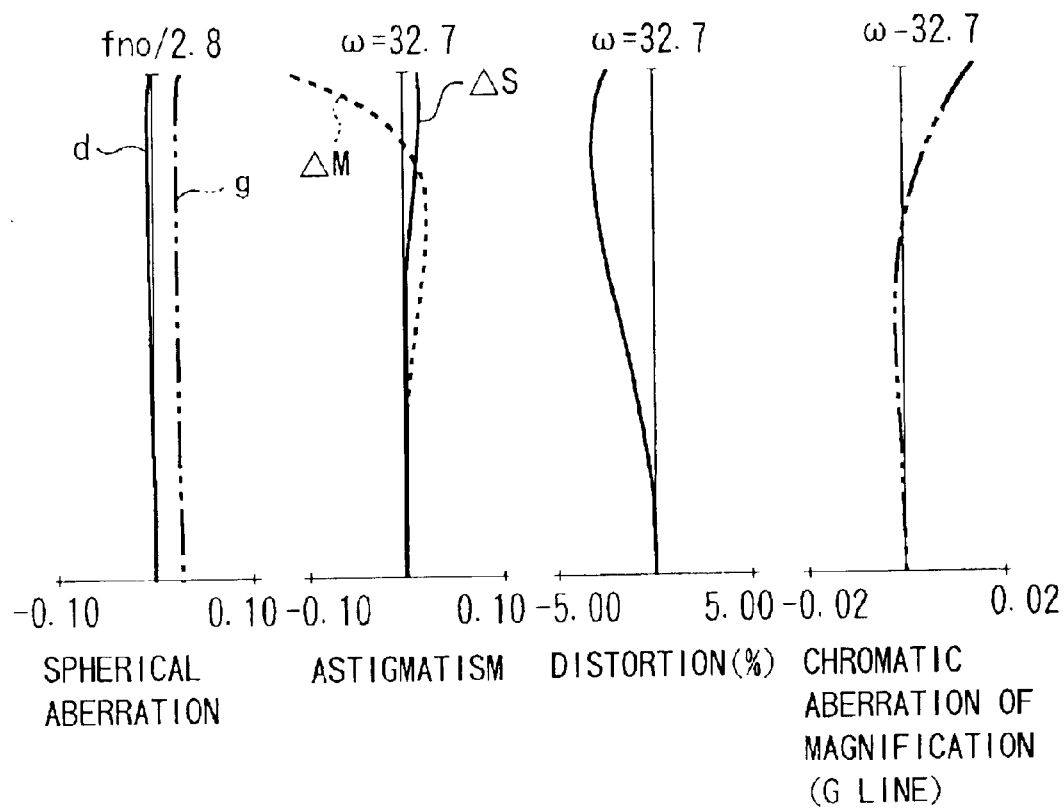
FIG. 12 shows aberrations in Numerical Example 6 of the present invention.
Figure 12:
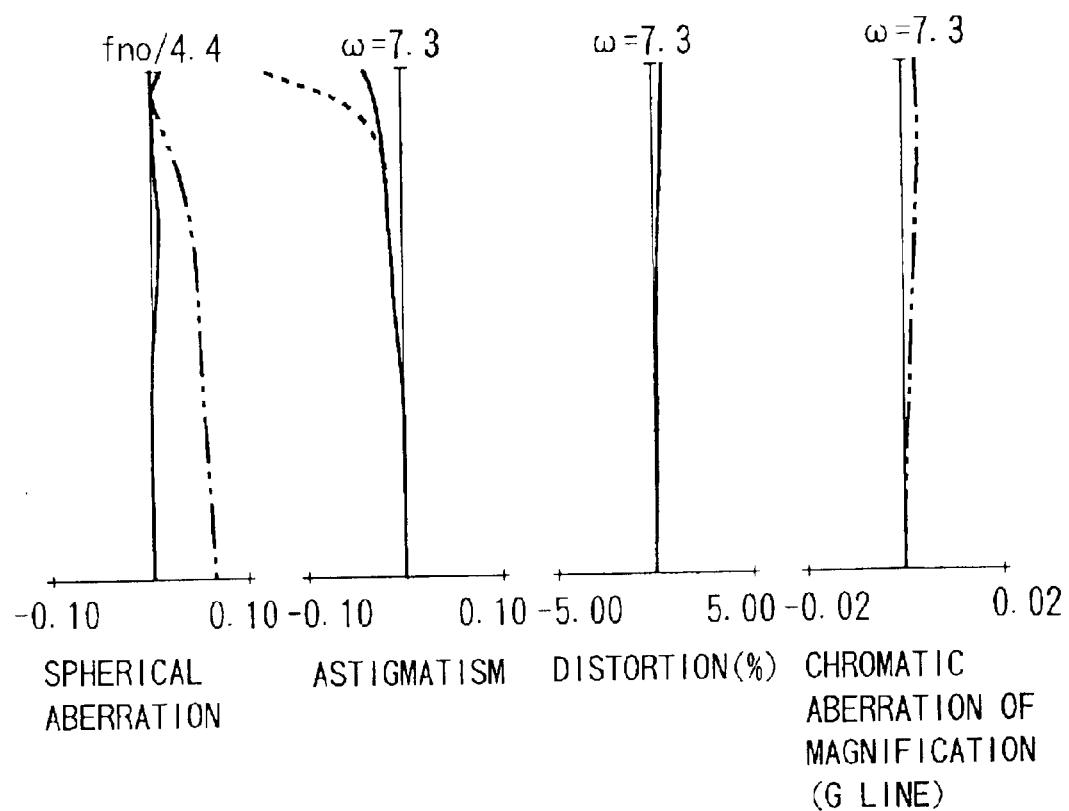

FIGS. 8, 10 and 12 show aberrations in Numerical Examples 4 to 6. In each of the figures, a curve d represents the aberration of a d line, a curve g represents the aberration of a g line, a curve ΔS represents the aberration on a sagittal image plane, and a curve ΔM represents the aberration on a meridional image plane, respectively.

As described above, according to Embodiment 4 to Embodiment 6, appropriately setting the arrangement of the optical powers in the respective lens units and the moving track during zooming in the zoom lens of the four lens unit structure can ensure favorable optical performance at an arbitrary zoom position.

Figure 13:
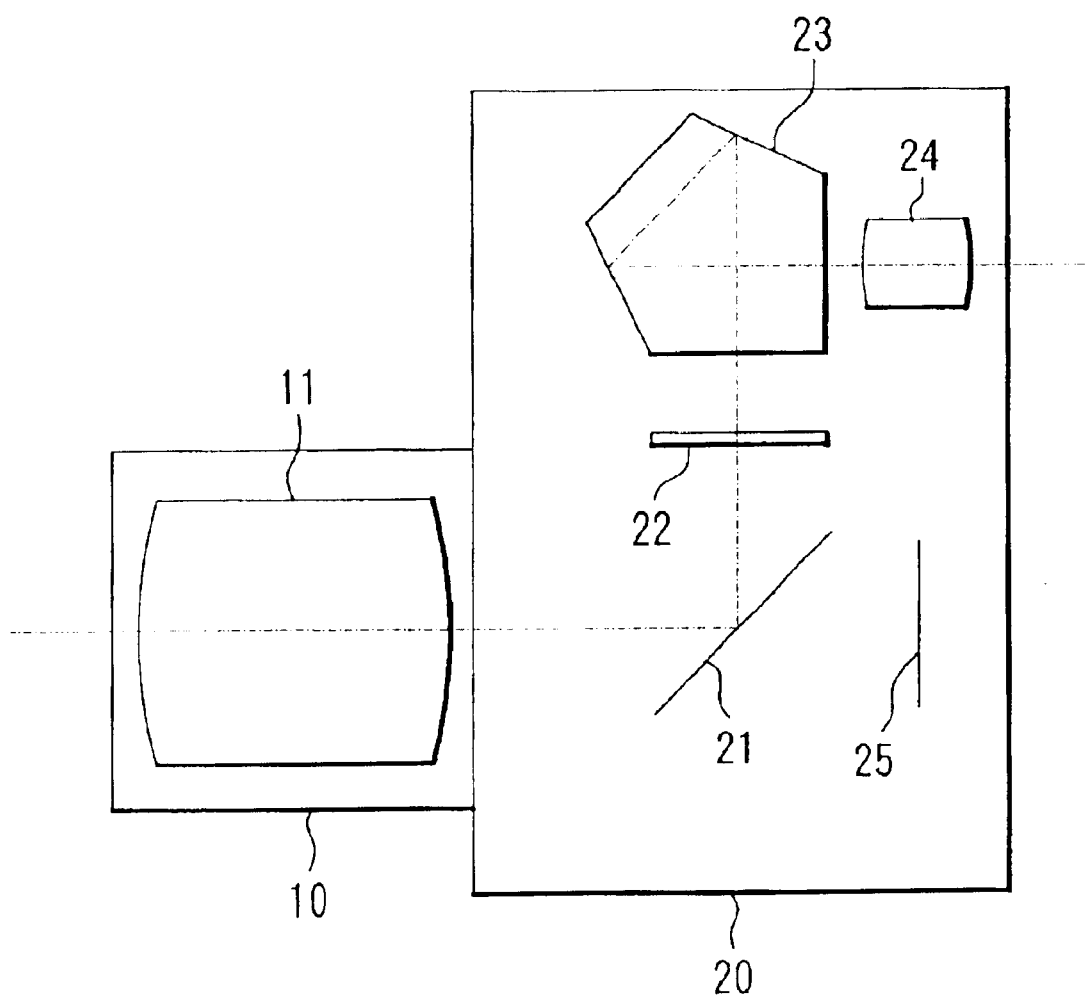
FIG. 13 is a section view of a digital camera having the zoom lens of any of Embodiments 1 to 6.

FIG. 13 shows a digital still camera which uses the zoom lens of any of Embodiment 1 to Embodiment 6 described above.

In FIG. 13, reference numeral 10 shows a zoom lens including an image-taking optical system 11, 20 shows a camera unit, 21 a quick return mirror, 22 shows a focusing screen, 23 shows a pentaprism, and 24 shows an eyepiece.

Reference numeral 25 shows a solid-state image pickup element (photoelectric conversion element) such as a CCD and a CMOS sensor. The solid-state image pickup element 25 photoelectrically converts an object image formed by the image-taking optical system 11 (zoom lens 10).

When a photographer sees an object through a viewfinder, the quick return mirror 21 disposed on an image-taking optical path directs a part of light rays from the object to the focusing screen 22, pentaprism 23, and the eyepiece 24, which constitute a viewfinder optical system, to allow optical observation of the object image. The light rays from the object passing through a half mirror section of the quick return mirror 21 is photoelectrically converted by the image pickup element 25, and the resulting image signal is displayed on an LCD or the like, not shown, to allow electrical observation of the object image.

On the other hand, when the photographer intends to take images, the quick return mirror 21 is retracted from the image-taking optical path, and the light rays from the object (the object image) is photoelectrically converted by the image pickup element 25, and the resulting image information is stored in a storage media, not shown.

The zoom lens of each of the aforementioned embodiments can be used not only in the digital still camera shown in FIG. 13 but also as a zoom lens for a video camera.

While preferred embodiments have been described, it is to be understood that modification and variation of the present invention may be without departing from the spirit or scope of the following claims.

What is claimed is:

1. A zoom lens comprising in order from an object side:
a first lens unit which has a positive optical power;
a second lens unit which has a negative optical power;
a third lens unit which has a positive optical power; and
a fourth lens unit which has a positive optical power,
wherein, during zooming from a wide angle end to a telephoto end, a spacing between the first lens unit and the second lens unit is increased, a spacing between the second lens unit and the third lens unit is decreased, a spacing between the third lens unit and the fourth lens unit is increased, and an aperture stop moves together with the third lens unit, and
the following condition is satisfied:

$$-1.0 < (Cw - Ct)/f3 < -0.6$$

where Cw represents a spacing between the third lens unit and the fourth lens unit on an optical axis at the wide angle end, Ct represents a spacing between the third lens unit and the fourth lens unit on the optical axis at the telephoto end, and f3 represents a focal length of the third lens unit.

2. The zoom lens according to claim 1, wherein, during zooming from the wide angle end to the telephoto end, the third lens unit moves toward the object side, and the fourth lens unit moves along a track which is convex toward the object side, and the following condition is satisfied:

$$0.2 < fw/f4 < 0.35$$

where fw represents a focal length of the entire zoom lens system at the wide angle end, and f4 represents a focal length of the fourth lens unit.

3. The zoom lens according to claim 1, wherein, during zooming from the wide angle end to the telephoto end, the first lens unit and the second lens unit move toward a track which is convex toward an image side.

4. The zoom lens according to claim 1, wherein the third lens unit consists of a positive lens element and a cemented lens in which a positive lens element and a negative lens element are cemented, in order from the object side, and the following condition is satisfied:

$$0.25 < fw/f4 < 0.35$$

where fw represents a focal length of the entire zoom lens system at the wide angle end, and f4 represents a focal length of the fourth lens unit.

5. The zoom lens according to claim 1, wherein the third lens unit consists of a positive lens element, a cemented lens in which a positive lens element and a negative lens element are cemented, and a positive lens element, in order from the object side, and the following condition is satisfied:

$$0.2 < fw/f4 < 0.3$$

where fw represents a focal length of the entire zoom lens system at the wide angle end, and f4 represents a focal length of the fourth lens unit.

6. The zoom lens according to claim 5, wherein the following condition is satisfied:

$$0.1 < f3/f3r < 0.4$$

where f3 represents the focal length of the third lens unit and f3r represents a focal length of a lens element closest to an image side of the third lens unit.

7. An image-taking apparatus comprising:
the zoom lens according to claim 1; and
a photoelectric conversion element which receives an object image formed by the zoom lens and photoelectrically converts the object image.

8. A zoom lens comprising in order from an object side:
a first lens unit which has a positive optical power;
a second lens unit which has a negative optical power;
a third lens unit which has a positive optical power; and
a fourth lens unit which has a positive optical power,
wherein, a spacing between the respective lens units changes during zooming, and
the following condition is satisfied:

$$0.9 < bwm/bwt < 2.0$$

where bwm represents an amount of movement of the second lens unit during zooming from a wide angle end to a position where a focal length fm of the entire zoom lens system is represented by $$fm = \sqrt{(fw \cdot ft)},$$

bwt represents an amount of movement of the second lens unit during zooming from the wide angle end to a telephoto end, fw represents a focal length of the entire zoom lens system at the wide angle end, and ft represents a focal length of the entire zoom lens system at the telephoto end.

9. The zoom lens according to claim 8, wherein the first lens unit consists of a single lens element having a positive optical power, and the following condition is satisfied:

$$0.05 < fw/f1 < 0.15$$

where f1 represents a focal length of the first lens unit.

10. The zoom lens according to claim 8, wherein, during zooming from the wide angle end to the telephoto end, the third lens unit monotonously moves toward the object side, and the fourth lens unit moves along a track which is convex toward the object side.

11. The zoom lens according to claim 8, wherein, during zooming from the wide angle end to the telephoto end, the first lens unit moves along a track which is convex toward an image side, and an overall length of the entire zoom lens system at the telephoto end is larger than an overall length of the entire zoom lens system at the wide angle end.

12. The zoom lens according to claim 8, wherein the following condition is satisfied:

$$0.1 < (Cw-Cm)/(Cw-Ct) < 0.3$$

where Cw represents a spacing between the third lens unit and the fourth lens unit on an optical axis at the wide angle end, Ct represents a spacing between the third lens unit and the fourth lens unit on the optical axis at the telephoto end, and Cm represents a spacing between the third lens unit and the fourth lens unit on the optical axis at the focal length fm of the entire zoom lens system represented by.

$$fm = \sqrt{(fw \cdot ft)}.$$

13. The zoom lens according to claim 8, wherein the following condition is satisfied:

$$-0.9 < f2/f3 < -0.6$$

where f2 and f3 represent focal lengths of the second and third lens units, respectively.

14. The zoom lens according to claim 8, wherein an aperture stop moves together with the third lens unit during zooming.

15. An image-taking apparatus comprising:
the zoom lens according to claim 8; and
a photoelectric conversion element which receives an object image formed by the zoom lens and photoelectrically converts the object image.

* * * * *